Figure 1:
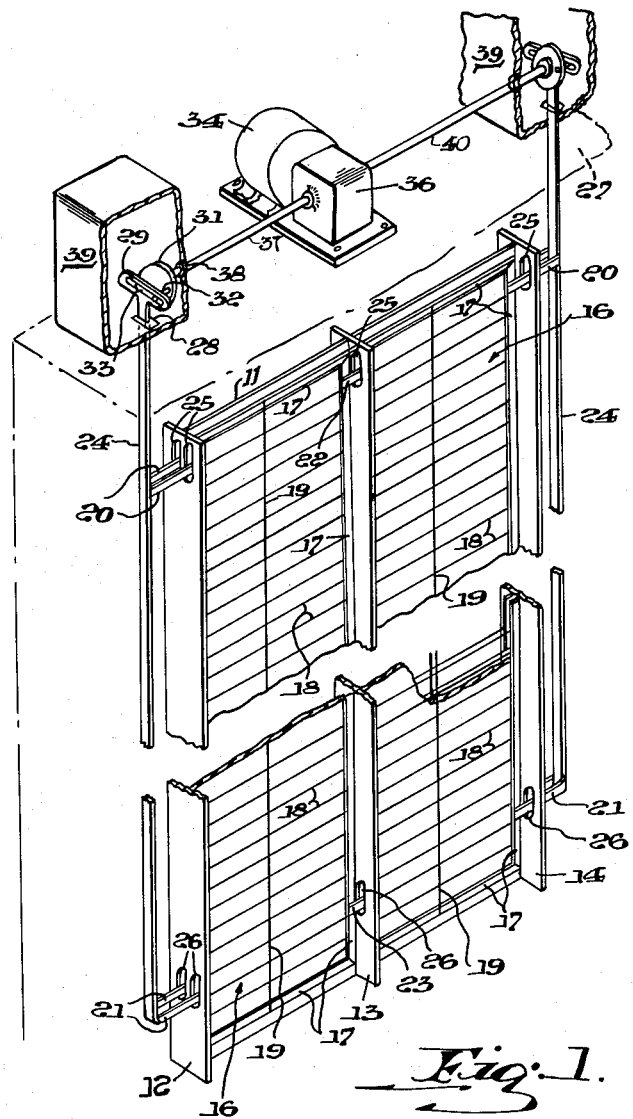

INVENTOR.
JOHN S. LAGARIAS.
BY
Leo J. MaLossi
his
ATTORNEY.

INVENTOR.
JOHN S. LAGARIAS
BY
Leo I. Ma Lossi
his
ATTORNEY

United States Patent Office 3,114,615
Patented Dec. 17, 1963

3,114,615
OSCILLATING SHEARING DEVICE FOR THE REMOVAL OF PRECIPITATED DRY DUST
John S. Lagarias, Pittsburgh, Pa., assignor to Koppers Company, Inc., a corporation of Delaware
Filed Dec. 9, 1960, Ser. No. 74,860
5 Claims. (Cl. 55—121)

The present invention relates generally to electrical precipitators and more particularly to an oscillating device for shearing dust from the collecting surfaces of the electrode assembly of a precipitator whereby to clean such electrode assembly.

In an electrical precipitator, a stream of gas containing suspended particles which are to be removed therefrom is passed through the precipitator and, by the action of an electrical field, the particles are caused to migrate to and be deposited upon a collecting electrode. Under normal circumstances, the deposited dust particles accumulate on the electrode building up to a sufficiently thick layer that unless this dust build up is removed the efficiency of the precipitator is reduced.

In the past, many different devices and methods have been tried for cleaning collector electrodes; by rapping or vibrating the electrode, or by scraping or brushing the electrode with heavy chains. One objectionable feature of the former method wherein the collector electrode is rapped intermittently with a pneumatic or electro-magnetic impulse-type rapper, is that large amounts of loose dust are suddenly dislodged from the electrodes during the intermittent rapping. In falling this dislodged dust disturbs that dust previously deposited in the hopper causing a certain amount of re-entrainment of this deposited dust thereby promoting conditions for sparking. The latter method of dust removal (scraping or brushing) has never become popular due to the necessity of cumbersome, complicated assemblies subject to costly mechanical failures.

Ideally, dust should be removed from the electrodes to the hoppers without re-entrainment, disturbance of dust already in the hopper, or interference with the precipitator operation.

It is therefore an object of the present invention to provide a shear device oscillating slowly or intermittently to dislodge dust as large aggregates from a collecting electrode.

Another object of the present invention is to provide for a precipitator a dust-removal apparatus providing a wide range of control over the rate at which the dust is removed from the collector electrodes.

It is a further object of the present invention to provide an oscillating shear device for satisfactorily removing dust from collector electrodes to the hoppers with a minimum amount of re-entrainment of this dust.

Still another object of the present invention is the provision of an oscillating shear device for the simultaneous uniform removal of precipitated dust from substantially the entire collector electrode surface as well as between the individual collector electrodes.

Thus, the present invention concerns a shearing device, such as a wire screen, mounted for oscillating movement across the collecting surfaces of an electrode assembly whereby by slowly and/or intermittently oscillating the wire screen the dust deposited on the collecting surface is removed evenly and uniformly, dropping as large aggregates.

Figure 2:
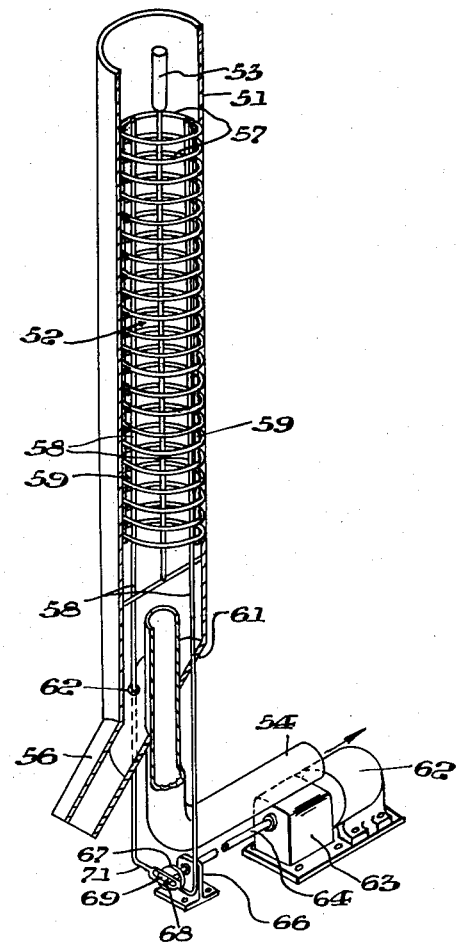

Other objects and many of the attendant advantages of this invention will be readily appreciated as the same becomes better understood by reference to the following detailed description when considered in connection with the accompanying figures in which like reference numerals designate like parts throughout the figures thereof and wherein:

FIG. 1 is an isometric view of a preferred embodiment of the present invention shown in combination with a collector electrode in a flat plate precipitator and FIG. 2 is a cut-away isometric view of a modification of the preferred embodiment of FIG. 1 showing this modification in combination with the tubular electrode of a high velocity dust concentrator.

Referring to FIG. 1 of the drawings, collector plate 11 represents one of a series of parallel plate electrodes in a conventional flat plate precipitator. The means for supporting collector plate 11 has not been shown in order to more clearly illustrate the present invention, it being sufficient to recognize that collector plates 11 as mounted must be insulated and ungrounded.

Stiffener members 12, 13, 14 provide the necessary rigidity for collector plate 11 and further serve as attachment means to which the support means (not shown) are joined in order to mount and position collector plate 11 in the precipitator. In place of the usual rapping device for shaking loose accumulated dust from the surfaces of collector plate 11, oscillating shear means in the form of flat shearing screens 16 are employed to clean collector plate 11. These shearing screens 16 are mounted on both sides of collector plate 11 preferably being snugly fitted along the opposite surfaces thereof and adapted for movement relative thereto.

Each screen 16 consists of frame 17, horizontal shear wires 18 spaced a minimum of two inches apart, and reinforcing risers 19. Since reinforcing risers 19 tend to accumulate dust the number of these employed should be maintained at a minimum. In order to move the screens 16 with an oscillating motion rigid horizontal pickup arms 20, 21 are fastened to frames 17 and those screens 16 on the same side of collector plate 11 are connected by means of brackets 22, 23. Pickup arms 20, 21 are fastened at the outer ends thereof to oscillating rods 24 which move in unison in a vertical direction to produce the simultaneous oscillating movement of all screens 16 on both sides of collector plate 11.

Each of stiffener members 12, 13, 14 are provided with horizontally and vertically aligned slots 25 near the upper ends thereof to receive the upper pickup arms 20 and upper bracket 22. Similar vertical slots 26 are provided near the lower end of screens 16 to receive lower pickup arms 21 and lower bracket 23. The longitudinal axes of slots 25, 26 are so disposed relative to the surfaces of collector plate 11 that screens 16 may be maintained having the desired clearance between the screen and plate. Thus, if desired, screens 16 may be held in contact with the surface of collector plate 11 or, if the dust encountered is sufficiently conducting in nature, the clearance between screens 16 and the surface of collector plate 11 may be set at a value sufficiently great as to allow as much as ¼" thick deposit to remain on the collecting surfaces. The length of vertical slots 25, 26 must, of course, be sufficiently great to accommodate the amplitude of screen oscillation, a distance at least equal to the spacing between the horizontal shear wires 18, in order to insure complete coverage of the surface of collector plate 11.

It is advantageous to locate the oscillating means outside the precipitator proper to enable ease of access thereto. Therefore, oscillating rods 24 are shown penetrating the precipitator roof 27 through packing gland 28, which gland serves both to align oscillating rod 24 and also to seal in the dust. Slotted-yoke 29 is fastened to or formed integral with the upper end of oscillating rod 24 and is connected to crank disc 31 by means of crank pin 32 slidingly engaged in slot 33 of slotted-yoke 29. Means for driving crank disc 31 consist of motor 34, speed reducer 36 and drive shaft 37 supported in shaft bearing 38. Drive shaft 40 shown projecting from the opposite side of speed reducer 36 is employed to drive a similar slotted-yoke crank arrangement at the other end of collector plate 11.

By operating motor 34, crank disc 31 is rotated causing crank pin 32 to slide in slot 33 as it moves slotted-yoke 29 up and down. As indicated above, the amplitude of the oscillating movement of screens 16 must be at least equal to the spacing between horizontal shear wires 18. Either continuous or intermittent screen oscillation may be employed but in the case of flat plate electrodes it is preferable to move the screen intermittently and with a slow motion whereby sufficient time will be allowed for precipitated dust to build up to a sizeable thickness whereby horizontal shear wires 18 will dislodge this dust in the form of large agglomerates. The speed of movement of screens 16 which has proven most satisfactory is movement at the rate of 2 inches per minute with a cycling rate of about 10 cycles per hour for a normal dust burden. Depending upon the nature of the dust these operating conditions will, of course, be subject to revision. In any event it can be seen that by the use of such a device a shearing force can be applied over substantially the entire extent of the surface of collector plate 11 at any one instant.

If the mesh of screens 16 is too small (i.e. less than 2" between strands), the dust will bridge from strand to strand and move with the oscillating screen preventing the application of the necessary shear force thereto for effectively dislodging such dust. It has been found that successful operation has resulted from using a screen having a shear wire spacing of 4" and snugly fitted along the surface of collector plate 11. Although the diameter of shear wires, or scraper strands, 18 is not critical in the range between 1/8" and 1/4" diameter, the design conditions determining the proper diameter are such that the diameter should not be small enough to cause corona to form therefrom and must be large enough to withstand the mechanical strains occurring during the shearing operation.

Dust free housing 39 covers the aperture through precipitator roof 27 and that portion of the oscillating means adjacent thereto in order to minimize air leakage from the precipitator. Housing 39 may be slightly pressurized in which case if there is any air leakage it will be into, rather than out of, the precipitator.

Tests have demonstrated that the presence of screens 16 on collector plate electrode 11 has no apparent effect on the electrical operation of the precipitator.

Although the oscillating shearing screen described above is shown as moving in a vertical direction, operation in a horizontal direction of a screen with vertical shear strands or the movement of shear strands arranged other than horizontally or vertically is equally feasible.

Since the speed of movement of screens 16 and the frequency of the cycling thereof (the dust shearing rate) may be readily adjusted for the particular application, this plate cleaning device may be used in connection with the precipitation of a variety of dry dusts i.e. cement dust, sodacake, fly ash.

Likewise, the present oscillating shearing device can also be employed in connection with the tubular electrode arrangement in the high velocity dry dust concentrator such as is disclosed in my U.S. Patent No. 2,906,369. Such an application is illustrated in FIG. 2 of the drawings. Tubular electrode 51 is shown therein with cylindrical shear screen 52 mounted concentric therewith for oscillating motion relative thereto.

In this particular illustration tubular electrode 51 is oriented in a substantially vertical position wherein a dust-laden gas stream enters the upper end thereof, is forced downwardly and subjected to the electric field generated between discharge electrode 53 and tubular electrode 51. As a result of exposure to this electrostatic field the gas stream is separated into a core of relatively clean gas with a surrounding zone, annular in cross section, of gas high in dust content. The cleaned gas passes into conduit 54 and is thereby separated from the balance of the dust-ladened gas stream which leaves by conduit 56. Of course, in its passage through tubular electrode 51 much of the dust is removed from the gas stream and precipitated on the inner surface of electrode 51. Since this dust deposit builds up in thickness, means must be provided to clean the inner surface of tubular electrode 51 for the same reasons discussed above in connection with the flat plate precipitator. As in the case of the plate electrode, the oscillating shearing device, in this case cylindrical shear screen 52, which is mounted for movement in a direction parallel to the central axis of tubular electrode 51, may fit snugly against the electrode surface or may be mounted with a slight clearance between the shear screen and the electrode wall permitting as much as a 1/4" thick deposit to remain on the surface if the dust is sufficiently conducting.

In order to prevent the precipitated dust from bridging the space separating the screen elements the cylindrical shear screen 52 is composed of parallel wire shear rings 57 spaced at least two inches apart and preferably 4 inches apart, the wire shear rings 57 being affixed to oscillating support rods 58 for movement therewith as oscillating support rods 58 are moved up and down by an oscillating drive means similar to that shown in FIG. 1. In order to provide the necessary rigidity for wire shear rings 57, reinforcing strands 59 have been fixed thereto to retain rings 57 in their relative positions and are oriented parallel to the support rods 58. Since such reinforcing strands tend to accumulate dust, they should be limited in number with some installations requiring as few as two such reinforcing strands.

As oscillating support rods 58 are operated to move shear screen 52 to clean dust from the inside wall of tubular electrode 51, this dust is preferably removed in agglomerated form and falls to sloping end 61 sliding from there to exit via conduit 56. Seals 62 (only one is shown) are provided at the points where oscillating support rods 58 move through sloping end 61 under the impetus of a drive mechanism made up of motor 62, speed reducer 63, drive shaft 64, bearing bracket 66, crank disc 67, crank pin 68, and slot 69 in slotted-yoke 71 which interconnects support rod 58.

Although the arrangement shown in FIG. 2 is preferred for its ease of construction, the shearing members may assume a variety of configurations; i.e. the shear wire may be wound in a helical shape and be actuated with the oscillating movement described above or may be rotated in an oscillating motion about the central axis of tubular electrode 51 or the shear wires may extend along the inner surface of tubular electrode 51 parallel to the aforementioned central axis, be reinforced by transverse rings and be rotated in an oscillatory motion about the central axis to remove deposited dust.

Although either intermittent or continuous operation of the shearing device 52 may be employed, continuous operation is, in general, more efficient than intermittent operation except that intermittent operation employing a screen movement of 1/2 cycle per minute has proven to be the most efficient with the screen being in motion for 50% of the time and with each interval of movement and stationary positioning lasting 10 seconds.

By the use of simple assemblies such as the oscillating shear screens disclosed herein uniform removal over the entire collector surface can be achieved, a wide range of control over the dust removal rate is made available and by removing the dust in large agglomerates, re-entrainment of the dust is greatly reduced. Further, because of its simplicity, this equipment can be incorporated into either the conventional flat plate precipitator or the high velocity dust concentrator without unduly encumbering these systems and without, therefore, presenting additional problems with regard to mechanical breakdowns.

Obviously many modifications and variations of the present invention are possible in the light of the above teachings. It is therefore to be understood, that within the scope of the appended claims, the invention may be practiced otherwise than as specifically described.

What is claimed is:

1. In an electrical precipitator, the combination comprising a fixed cylindrical electrode element for collecting dust particles by electrostatic attraction from a gas stream moving past a collecting surface of said electrode element, a fixed discharge electrode, means mounted between said collecting surface and said discharge electrode for removing collected dust from said surface comprising a cylindrical shearing means mounted within said cylindrical electrode element adjacent said surface for oscillating movement relative thereto, said shearing means having a plurality of parallel rings spaced not less than about two inches apart for applying a shearing force to the collected dust over substantially the entire extent of said collecting surface whereby said collected dust is uniformly removed therefrom and means for oscillating said shearing means relative to said collecting surface.

2. The combination of elements recited in claim 1 wherein the parallel spaced rings are disposed substantially perpendicular to the axis of the cylindrical shearing means.

3. In an electrical precipitator wherein at least one vertically-extending collector electrode collects dust particles from a gas stream passing therethrough, the improvement comprising means mounted adjacent a collecting surface of said electrode for removing collected dust from said surface said means comprising shearing means having a plurality of substantially parallel wires spaced not less than two inches apart, a plurality of reinforcing members for maintaining said wires in spaced relationship, and means for cyclically oscillating said shearing means parallel to said collecting surface and in a direction perpendicular to the direction in which the wires extend, said cycle of oscillation having an amplitude at least equal to the spacing between the wires for applying a shearing force over substantially the full area of said collecting surface during a cycle of oscillation.

4. In an electrical precipitator wherein a housing contains a plurality of spaced, vertically-extending collector electrodes having collecting surfaces for receiving dust particles from a gas stream passing through the precipitator housing so as to remove the particles from the gas, the improvement for removing collected dust particles from said collector electrodes comprising a frame mounted in said housing, a plurality of substantially parallel wires spaced about four inches apart mounted in said frame, said wires being disposed less than about one-quarter inch from the surfaces of said collector electrodes, a plurality of reinforcing members for maintaining said wires in spaced relationship, and means for oscillating said wires parallel to said collector electrodes and in a direction perpendicular to the direction in which the wires extend, said cycle of oscillation having an amplitude at least equal to the spacing between the wires for applying a shearing force over substantially the full area of said collecting surfaces during a cycle of oscillation.

5. In an electrical precipitator wherein a housing contains a plurality of spaced, vertically-extending collector electrodes for the separation of dust particles from a gas stream passing through the precipitator housing, the improvement comprising means mounted adjacent a collecting surface of each of said electrodes for removing collected dust from said surface, said means comprising shearing means having a plurality of substantially parallel wires spaced about four inches apart, said shearing means being disposed less than about one-quarter inch from said collecting surface, a plurality of reinforcing members for maintaining said wires in spaced relationship, and means for oscillating said shearing means parallel to said collecting surface and in a direction perpendicular to the direction in which the wires extend, said cycle of oscillation having an amplitude at least equal to the spacing between the wires for applying a shearing force over substantially the full area of said collecting surface during a cycle of oscillation, said means for oscillating said shearing means comprising a plurality of pick-up arms fastened to said shearing means, a rod fastened to each of said pick-up arms, a slotted yoke at one end of each rod, a rotatable crank disc associated with each slotted yoke, and means for rotating said crank discs.

References Cited in the file of this patent

UNITED STATES PATENTS

| 1,442,301 | Sheek | Jan. 16, 1923 |
| 1,451,418 | Dillion et al. | Apr. 10, 1923 |
| 1,479,271 | Walcott | Jan. 1, 1924 |
| 1,484,260 | Gibbs | Feb. 19, 1924 |
| 1,791,338 | Wintermute | Feb. 3, 1931 |
| 2,599,842 | King | June 10, 1952 |

FOREIGN PATENTS

| 704,008 | France | Feb. 16, 1931 |
| 726,073 | Great Britain | Mar. 16, 1955 |

UNITED STATES PATENT OFFICE
CERTIFICATE OF CORRECTION

Patent No. 3,114,615              December 17, 1963

John S. Lagarias

It is hereby certified that error appears in the above numbered patent requiring correction and that the said Letters Patent should read as corrected below.

Column 2, line 16, for "must be insulated and ungrounded" read -- must be uninsulated and grounded --.

Signed and sealed this 7th day of July 1964.

(SEAL)
Attest:

ERNEST W. SWIDER
Attesting Officer

EDWARD J. BRENNER
Commissioner of Patents